(12) United States Patent
Clementides

(10) Patent No.: US 11,543,896 B2
(45) Date of Patent: Jan. 3, 2023

(54) SYSTEM AND METHOD FOR TYPING ASSISTANCE

(71) Applicant: DACCODES LTD, Vantaa (FI)

(72) Inventor: Athanasios Clementides, Helsinki (FI)

(73) Assignee: DACCODES LTD

(*) Notice: Subject to any disclaimer, the term of this patent is extended or adjusted under 35 U.S.C. 154(b) by 0 days.

(21) Appl. No.: 17/582,977

(22) Filed: Jan. 24, 2022

(65) Prior Publication Data

US 2022/0147158 A1    May 12, 2022

Related U.S. Application Data

(63) Continuation of application No. 17/177,105, filed on Feb. 16, 2021, now Pat. No. 11,231,789.

(60) Provisional application No. 62/977,070, filed on Feb. 14, 2020.

(51) Int. Cl.
    *G06F 3/04886*    (2022.01)
    *G06F 3/023*    (2006.01)
    *G06F 40/274*    (2020.01)
    *G06F 3/04895*    (2022.01)

(52) U.S. Cl.
    CPC .......... *G06F 3/0237* (2013.01); *G06F 3/0236* (2013.01); *G06F 3/04886* (2013.01); *G06F 3/04895* (2013.01); *G06F 40/274* (2020.01)

(58) Field of Classification Search
    CPC .............. G06F 3/0237; G06F 3/04886; G06F 40/274; G06F 3/013; G06F 3/0481; G06F 3/04842; G06F 3/03547; G06F 40/242; G06F 1/1626; G06F 1/169; G06F 3/0236; G06F 3/0338; G06F 3/0362; G06F 3/04817; G06F 3/0482; G06F 3/04883; G06F 40/169; G06F 40/232; G06F 40/247; G06F 40/268; G06F 3/04895; G06F 1/1632; G06F 2203/04803; G06F 3/015; G06F 3/016
    See application file for complete search history.

(56) References Cited

U.S. PATENT DOCUMENTS

| | | | |
|---|---|---|---|
| 6,542,170 B1* | 4/2003 | Williams | H04M 1/2748 715/847 |
| 8,266,528 B1* | 9/2012 | Hayes | G06F 40/274 715/255 |
| 2010/0149107 A1 | 6/2010 | Perry | |
| 2015/0134642 A1* | 5/2015 | Chomley | G06F 3/0237 707/722 |
| 2018/0286401 A1* | 10/2018 | Oh | G10L 15/22 |
| 2019/0051298 A1* | 2/2019 | Lee | H04M 1/72403 |

* cited by examiner

*Primary Examiner* — Rayeez R Chowdhury
(74) *Attorney, Agent, or Firm* — Krista A. Wittman

(57) ABSTRACT

A system and method for typing assistance is provided. One or more letter selections are received from a user via a keyboard. Examples of one or more words including the received letter selections are selected from a dictionary list during predictive typing and provided to the user. An additional letter selection is received. A determination is made that no words with the letter selections and the additional letter selection exist in the dictionary list. Keys for all letters on the keyboard are disabled. Artificial intelligence functionality is activated and one or more of the disabled keys are enabled via the artificial intelligence functionality.

20 Claims, 18 Drawing Sheets

SYSTEM AND METHOD FOR TYPING ASSISTANCE

FIELD

The present invention relates in general to typing and in particular, to a predictive typing assistance method that helps users to more efficiently and accurately type text into a text receiving system.

BACKGROUND

Generally, text input receiving systems accept typed text via a standard QWERTY or ALPHANUMERIC keyboard, which is often provided as physical hardware or virtual software, such as one displayed by a graphical user interface. A user enters text by pressing the keys of the keyboard one at a time, forming words. Text input receiving systems use internal dictionary lists as data sources in order to provide grammar related services in conformance with the selected language, such as providing word suggestions for the particular combination of letters typed.

Standard typing on a physical hardware or virtual software keyboard can result in user mistakes. Specifically, typing is error-prone, especially in small hosting devices with relatively small or restricted screen areas, like in mobile phones and tablet devices. Words are often misspelled and are most commonly due to a user's fingertip, which creates a larger pressing area than a keyboard's key or button area since the keyboard's keys and buttons are situated very close to each other.

Current typing assistance methods often provide suggestive typing assistance in form of word completion but do not take into consideration the keys and buttons on the keyboard as words are being typed. For example, suggestive typing assistance can result into an incorrect word completion when the intended key to be pressed is missed. The possibility of this adverse result can be greatly reduced if typing assistance could guide the user not to press incorrect keys and therefore take into consideration the keys and buttons on the keyboard.

Another current typing assistance solution implemented on virtual keyboards employs a technique that requires typing text by sliding one's fingertip across the keyboard. Sliding the fingertip to type text has a high learning curve, demands a lot of practice and requires its users to be technology savvy.

Accordingly, a typing assistance method that is easy to use and that prevents misspelled words by pressing wrong keys is needed.

SUMMARY

Predictive typing assistance can consider the keys and buttons of the keyboard as words are being typed. Specifically, the predictive typing assistance can utilize a graphical user interface to provide a visible display of information to the user, a physical or virtual keyboard arranged with the standard QWERTY, ALPHANUMERIC or other layout of keys and buttons to provide means for text input to the user and internal dictionary lists, each including words of a specific language, as data sources. A multipurpose function key or button that enables user collaboration with the predictive typing assistance intelligence can be provided.

The predictive typing assistance can activate and deactivate the keys of the keyboard during typing. An active key can receive user press input whereas an inactive key cannot. A multipurpose function key displays information about the typing process, exhibits artificial intelligence functionality, and provides services that interact with a data source. Internal dictionary lists provide the data to the intelligent behavior.

A use cycle of the typing assistance starts when the beginning of a word is being typed and respectively ends when the typed word is completed. Typically, the beginning of a word has more possible matching options in the dictionary list than an almost completed word. Thus, during the life cycle of the present method, there may be more active than inactive keys on the keyboard when the beginning of a word is being typed. Respectively, there are likely more inactive than active keys on the keyboard by the end of a word and before that word is completely typed. The active and inactive keys are determined based on whether each such key is a possibility for inclusion in the word being typed and specifically, the next letter. For example, if the letter "z" is typed, the active keys may include the letters, "e," "i," "o," "u," or "y," as well as other letters. Possible dictionary words for the active key "e" can include "zebra" or "zealotry", whereas an active key for the letter u can be provided for the word "zucchini". If there are no known words for a letter, such as the letter "b," following the letter "z," the letter key for "b" is rendered inactive.

The predictive typing assistance can be interrupted by the user when words unknown to the data source are intended to be typed. When the predictive typing assistance is interrupted, spelling typing assistance with predictive behavior can be provided. New words can be entered into the dictionary list, making the data source extendable. In addition, matching options of the dictionary list may be shown to the user. Also, additional functionality may allow the user to modify the dictionary list by removing added contents.

An embodiment provides a system and method for predictive typing assistance. A selection of a key via a keyboard is received. The selected key is associated with a letter and the letter of the selected key is compared with a list of words. Letters that follow the selected letter in one or more words in the list of words are identified and keys associated with the letters are enabled for selection by the user based on the list of words. Letters that do not follow the selected letter are identified and keys for the identified letters are disabled from selection by the user. A multifunction key to allow interruption of the disabled keys upon selection of the letter key is enabled.

A further embodiment provides a system and method for typing assistance. One or more letter selections are received from a user via a keyboard. Examples of one or more words including the received letter selections are selected from a dictionary list during predictive typing and provided to the user. An additional letter selection is received. A determination is made that no words with the letter selections and the additional letter selection exist in the dictionary list. Keys for all letters on the keyboard are disabled. Artificial intelligence functionality is activated and one or more of the disabled keys are enabled via the artificial intelligence functionality.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, including time and clustering of events, all without departing from their spirit and the scope.

3

Accordingly, the drawings and detailed description are to be regarded as illustrative in nature and not as restrictive.

DETAILED DESCRIPTION

Figure 1:
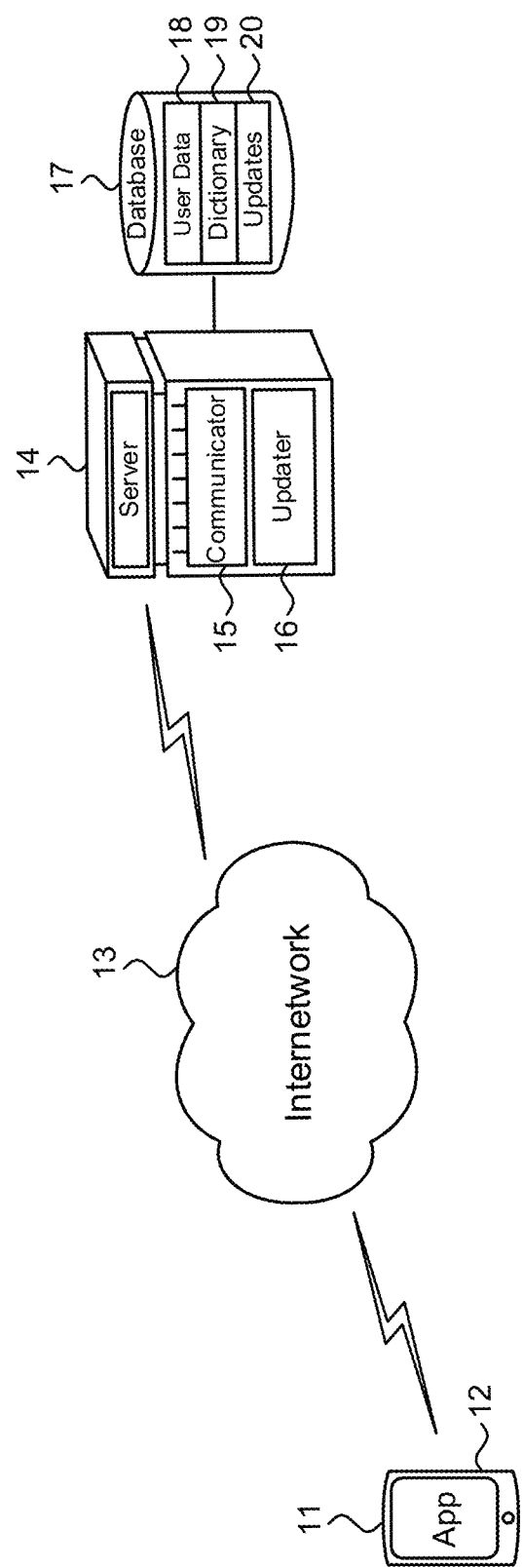
FIG. 1 is a block diagram showing a system for predictive typing assistance, in accordance with one embodiment.

Predictive typing assistance helps prevent user errors in misspelling words, while also helping to increase a speed of typing by a user. FIG. 1 is a block diagram showing a system 10 for predictive typing assistance, in accordance with one embodiment. A user can access a computer application 12 for predictive typing assistance for installation on a mobile device 11 via a communicator 15 of a server 14. The server's 14 communicator 15 provides data to and receives data from the mobile device 11. The server 14 also includes an updater 16, which accesses updates to the application 12 from a database 17 interconnected to the server 14 and provides the updates 20 to the mobile device 11. The database 17 also stores user data 18 and dictionaries 19. The user data 18 can include login information for the user, while the dictionaries 19 can include subject specific dictionaries, different language dictionaries, as well as fictional dictionaries, such as based on the Harry Potter book series. Upon installation of the application, the user can be validated using the user data 18 and one or more dictionaries can be selected for use with the predictive typing assistance.

Figure 2:
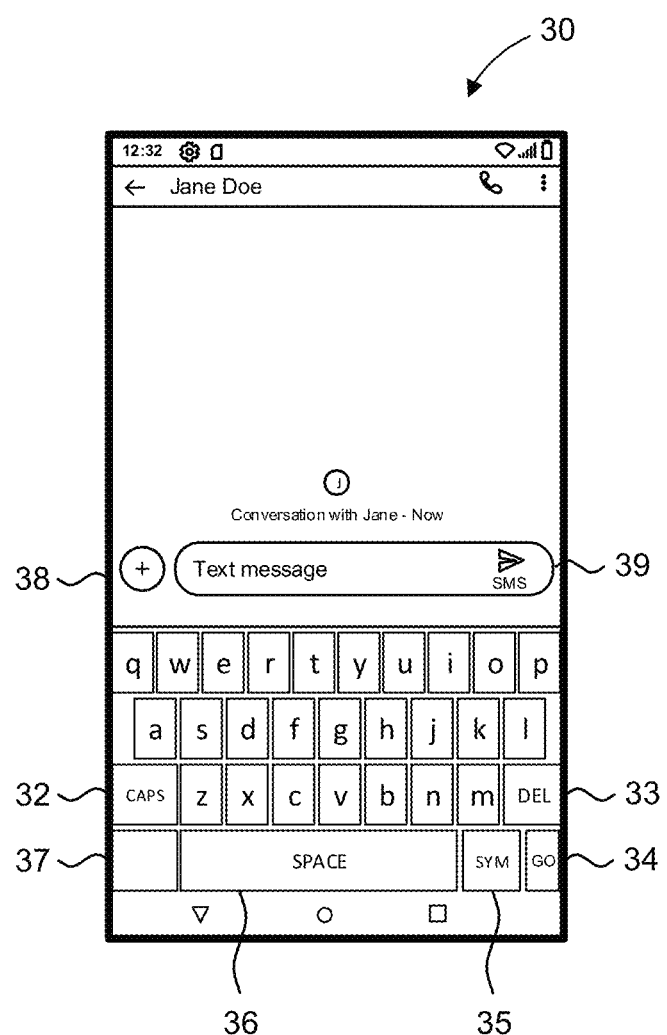
FIG. 2 is a block diagram showing, by way of example, a keyboard.

The predictive typing assistance can be utilized via a keyboard or other type of selectable keys that are used to type words. FIG. 2 is a block diagram showing, by way of example, a keyboard 30. The keyboard 30 can be a physical or virtual keyboard arranged with the standard QWERTY, ALPHANUMERIC or other layout of keys and buttons to provide means for text input. In this example, the keyboard is a simplified QWERTY virtual keyboard of a mobile device (not shown) that includes alphabetic keys 31, a case shift key 32, a backspace key 33, an enter key 34, a symbols key 35, a space key 36, and the multipurpose function key 37. The user types words in a text area 39, which can be located above the keyboard and a dictionary list area 38, which can be located between the text area 39 and the keyboard 30, to display words from a dictionary list associated with the mobile device of the user. The alphabetic keys 21 are used to type text, while the case shift key 32 allows a user to capitalize letters and the space key 36 allows a user to enter a space between typed words upon selection of those keys. The backspace key 33 allows a user to delete one or more letters and the enter key 34 allows a user to enter text on a new text line, while the symbols key 35 allows a user to enter numbers, punctuation, or other symbols in the text area 39. The multipurpose function key 37 allows a user select whether the predictive assistance may be interrupted upon selection of the key. One or more dictionaries can be used, including dictionaries based on different languages or groupings of words based on professional disciplines or areas of subject matter.

Using Predictive Typing Assistance to Type a Word known to the Dictionary list

The following three scenarios demonstrate the present predictive typing assistance method's intelligent behavior with reference to the accompanying figures.

In one example of predictive typing assistance, a user enters the word "hello," which exists in the dictionary list associated with the user. Artificial intelligence functionality is not enabled, but can provide continued spelling typing assistance based on the typed character sequence, rather than based on entries in a dictionary, as further described below with respect to FIGS. 9-23. Before the word is started to be typed, all the alphabetic keys of the keyboard are enabled. When the keys are enabled, they are available for selection by the user. When all the alphabetic keys on the keyboard are enabled, such as before a word is typed, the multipurpose function key can be disabled.

Figure 3:
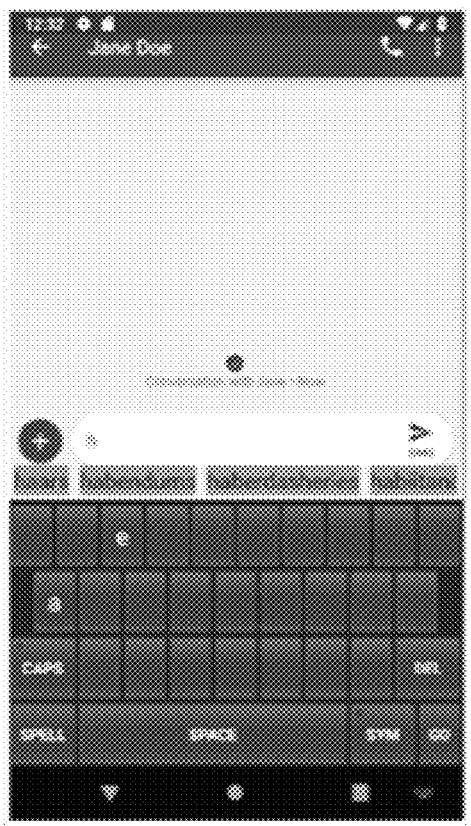
FIG. 3 is a block diagram showing, by way of example, the keyboard of FIG. 1 with an "h" key press to type a word in a dictionary.

FIG. 3 is a block diagram showing, by way of example, the keyboard of FIG. 1 with an "h" key press to type a word in a dictionary. The "h" key is pressed by the user to begin typing of the word "hello," which triggers intelligence of the predictive assistance. The keys, which correspond to the letters that do not exist in words of the dictionary list after the letter "h" are disabled so that they are not available for selection by the user. For example, the "t"-key is disabled because there are no words in the dictionary list starting with the character sequence "ht." Similarly, the present method enables the keys which correspond to the letters that exist in words of the dictionary list after the letter "h". So, the "a"-key is enabled because there are words in the dictionary list starting with the character sequence "ha," such as hay or Halloween, which can be displayed in the dictionary list area above the keyboard. In the present example, the active keys are represented by a letter displayed on the key, whereas the inactive keys do not show the letter assigned to that key. However, other indications of active keys and inactive keys are possible such as lighting up the active keys or changing all inactive keys to a select color, while the inactive keys can be identified by a different color.

Upon selection of the "h" key, the multipurpose function key activates, indicating that the predictive assistance may be interrupted. This operation will be further described below with respect to FIGS. 9-23. Similar to the letter keys, the multipurpose function key can be shown as active or inactive based on an icon, such as a design or word, or based on assigned colors.

Figure 4:
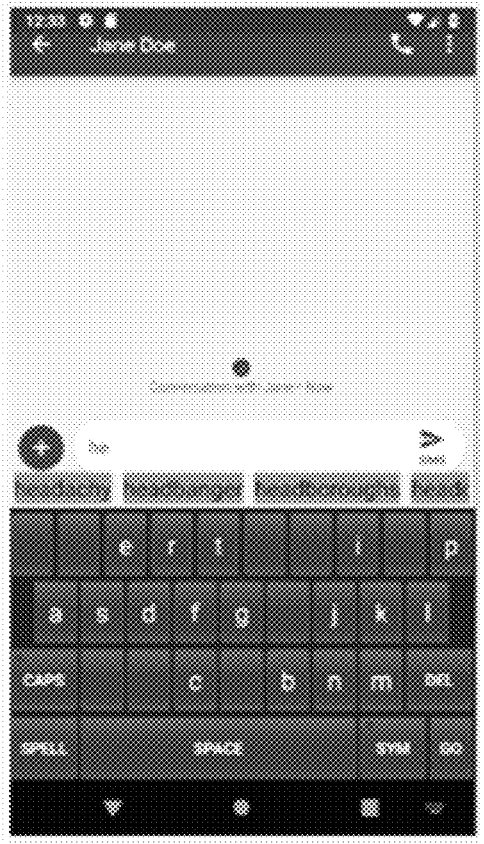
FIG. 4 is a block diagram showing, by way of example, the keyboard of FIG. 1 with an "e" key press to type a word in a dictionary.

FIG. 4 is a block diagram showing, by way of example, the keyboard of FIG. 1 with an "e" key press to type a word in a dictionary. The user can select the "e"-key by pressing the key. The keys which correspond to the letters that do not exist in words of the dictionary list after the letter sequence "he" are disabled and not available for selection by the user. The previously disabled "t"-key is now enabled because there are words in the dictionary list starting with the character sequence "het."

Figure 5:
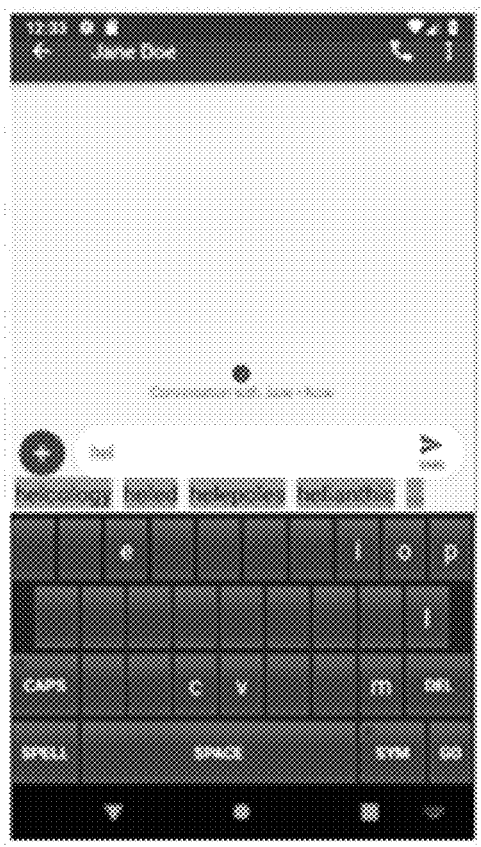
FIG. 5 is a block diagram showing, by way of example, the keyboard of FIG. 1 with an "l" key press to type a word in a dictionary.

FIG. 5 is a block diagram showing, by way of example, the keyboard of FIG. 1 with an "l" key press to type a word in a dictionary. The "l"-key is pressed. The state of the keyboard's keys change after each key press based on whether the word being typed is recognized by the dictionary list's contents and therefore predicted. Keys that were enabled before this key press may be disabled after the key press and vice versa, depending on the matches found in the dictionary list. The present method enables a key on the keyboard when the typed letter character sequence and a letter corresponding to a key form a word or part of a word that exists in the dictionary list. When the combination of the typed letter character sequence and a particular letter does not form a word or part of a word that exists in the dictionary list, the key corresponding to that letter is disabled.

Figure 6:
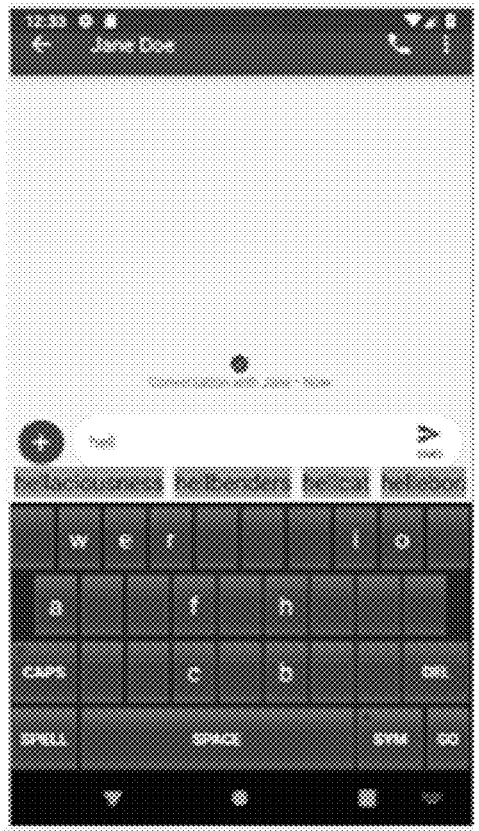
FIG. 6 is a block diagram showing, by way of example, the keyboard of FIG. 1 with an "l" key press to type a word in a dictionary.

FIG. 6 is a block diagram showing, by way of example, the keyboard of FIG. 1 with an "l" key press to type a word in a dictionary. The "l"-key is pressed again. Typically, as the typed letter character sequence becomes longer, the number of the available matches in the dictionary list can decrease, thus the number of the enabled keys on the keyboard decreases.

Figure 7:
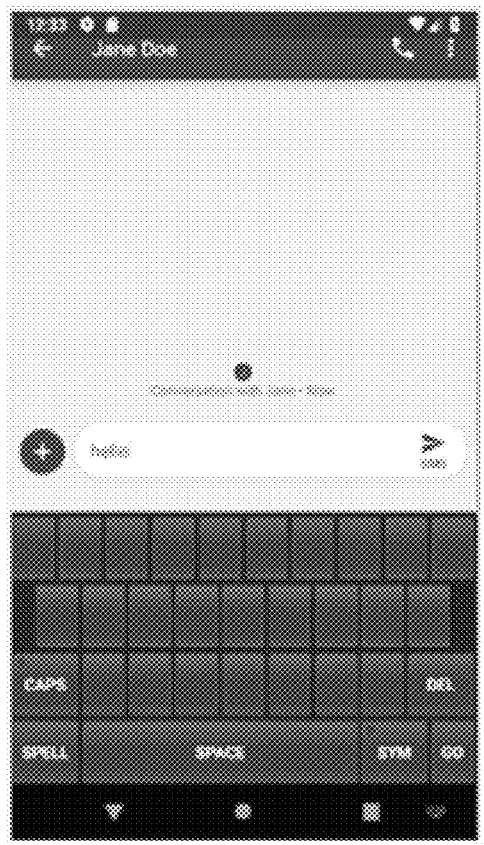
FIG. 7 is a block diagram showing, by way of example, the keyboard of FIG. 1 with an "o" key press to type a word in a dictionary.

FIG. 7 is a block diagram showing, by way of example, the keyboard of FIG. 1 with an "o" key press to type a word in a dictionary. The "o"-key is pressed. The intended word has been typed but the intelligent life cycle of the predictive assistance has not yet been completed. All letter keys can be disabled since there are no more matches in the dictionary list that start with the character sequence "hello." The multipurpose function key remains active, indicating that the predictive assistance may be interrupted, allowing the user to start spelling typing assistance and introduce a new word that starts with the letter sequence "hello," as described below.

Figure 8:
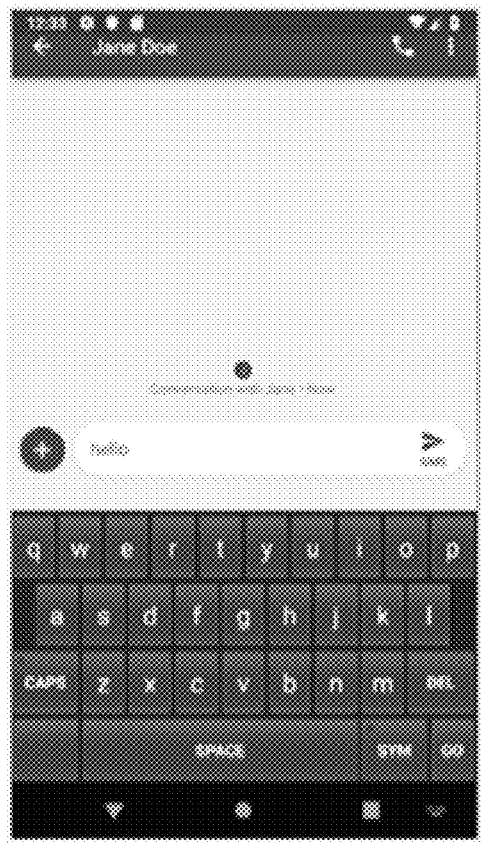
FIG. 8 is a block diagram showing, by way of example, the keyboard of FIG. 1 with a space key press to type a word in a dictionary.

FIG. 8 is a block diagram showing, by way of example, the keyboard of FIG. 1 with a space key press to type a word in a dictionary. The space-key is pressed. The intended word "hello" has been typed and the intelligent life cycle of the predictive typing assistance is completed, making all alphabetic keys on the keyboard enabled for typing of a next word. The completion of the intelligent life cycle occurs when the intended word has been typed, which can be identified by a non-letter key press, like the space key. Other non-letter keys are possible to indicate the end of the typing of the word and thus, intelligent life cycle. Subsequently, the multipurpose function key is disabled.

The user can enjoy the predictive typing assistance when the word intended to be typed exists in the dictionary list. When a user intends to type a word that does not exist in the dictionary list, at some point during typing, one of the keys corresponding to a letter of the intended word will be disabled. In this case, the user has the option to interrupt the predictive typing assistance and start the spelling typing assistance, which includes predictive behavior. Spelling typing assistance displays the present method's intelligence by reversing the state of the enabled and disabled keys for the next key press, thus demonstrating predictive behavior by enabling a previously disabled key. After the next key press, all the keys on the keyboard will be enabled until the word is completed, provided that the artificial intelligence functionality, as described below, is not enabled.

Using Predictive Typing Assistance with Predictive Spelling Behavior to Type a Word Not in the Dictionary list In a further example, the user enters the word "dns," which does not exist in the dictionary currently in use by the user. Artificial intelligence functionality is not enabled. Upon typing the word, the user can enter the new word in the dictionary list. Before the word is started to be typed, all the alphabetic keys on the keyboard are enabled except for the multipurpose function key, as illustrated in FIG. 2.

Figure 9:
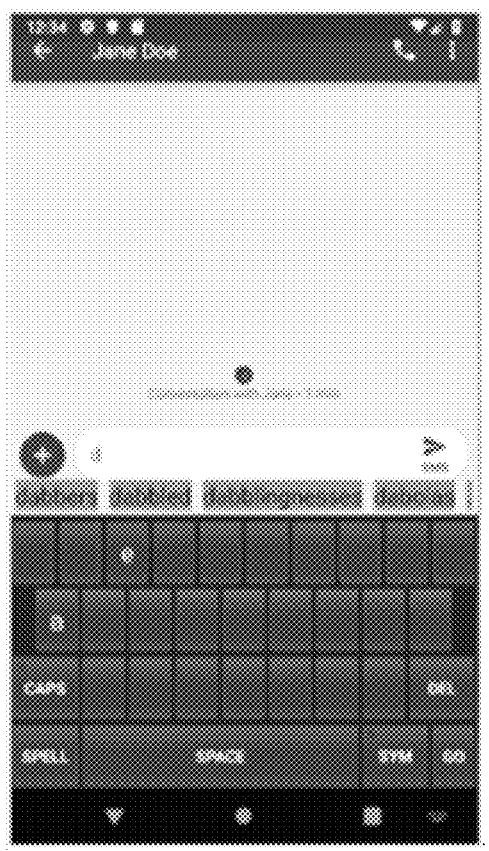
FIG. 9 is a block diagram showing, by way of example, the keyboard of FIG. 1 with a "d" key press to type a word not in a dictionary.

FIG. 9 is a block diagram showing, by way of example, the keyboard of FIG. 1 with a "d" key press to type a word not in a dictionary. The "d"-key is pressed. The life cycle of the predictive typing assistance intelligence begins and the keys which correspond to the letters that do not exist in words of the dictionary list after the letter "d" are disabled. The "n"-key which corresponds to the next character of the intended "dns"-word is disabled, because there are no words in the dictionary list starting with the character sequence "dn," When there are disabled keys on the keyboard, the multipurpose function key activates, making the spelling typing assistance available to the user. Now, the multipurpose function key activates and indicates with its labeled text ("SPELL") that the predictive assistance may be interrupted by starting the spelling typing assistance.

The "SPELL"-labeled key is pressed and a state of the keys is reversed to provide the spelling typing assistance. For instance, keys that were enabled before the pressing of the "SPELL"-labeled key now become disabled after the press since the enabled keys were not useful and vice versa. Alternatively, all the keys can become enabled. Among others, the "n"-key is now enabled.

Figure 10:
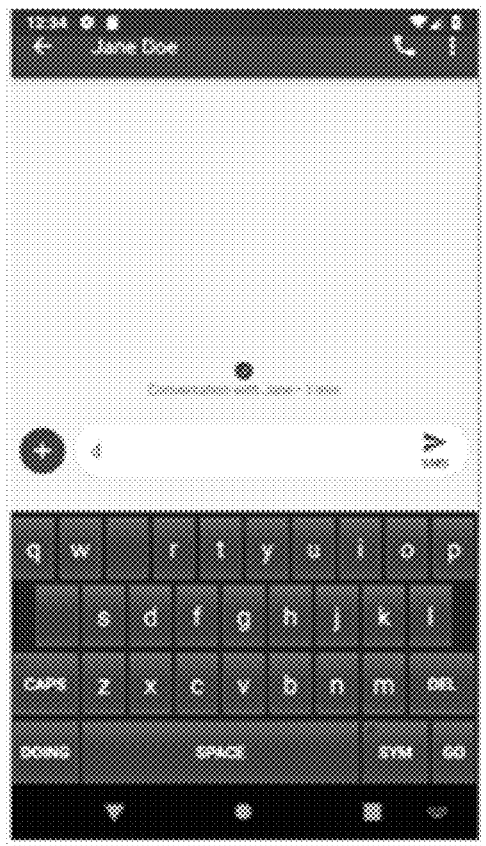
FIG. 10 is a block diagram showing, by way of example, the keyboard of FIG. 1 after the "SPELL"-labeled key has been pressed to type a word not in a dictionary.

FIG. 10 is a block diagram showing, by way of example, the keyboard of FIG. 1 after the "SPELL"-labeled key has been pressed to type a word not in a dictionary. Once the "SPELL" label is pressed, indicating that the spelling typing assistance is in progress, the multipurpose function key changes label text to "DOING,". The dictionary list area above the keyboard is empty since a new word, unknown to the dictionary list, is about to be typed.

Figure 11:
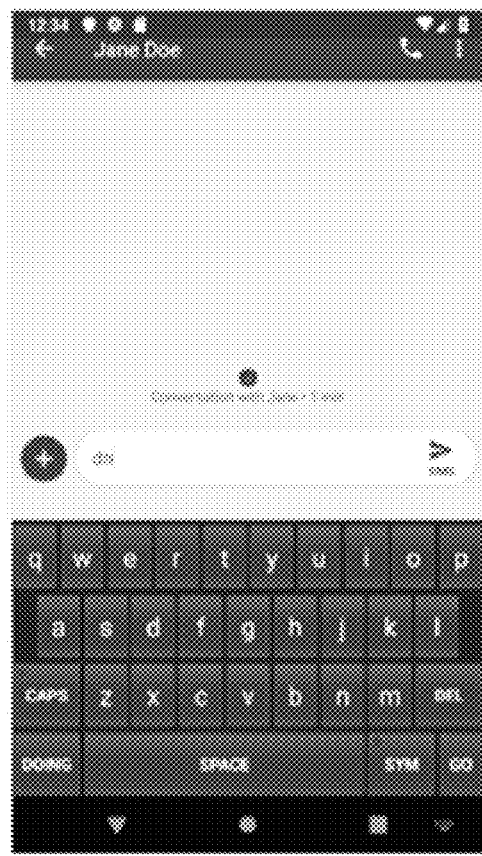
FIG. 11 is a block diagram showing, by way of example, the keyboard of FIG. 1 with an "n" key press to type a word not in a dictionary.

FIG. 11 is a block diagram showing, by way of example, the keyboard of FIG. 1 with an "n" key press to type a word not in a dictionary. Now that the multipurpose key has been pressed and the "n"-key is selectable, the "n"-key is pressed. During the spelling typing assistance, only the first character key press is assisted when the artificial intelligence functionality is disabled. After that, all alphabetic keys become enabled until the completion of the intended word.

Figure 12:
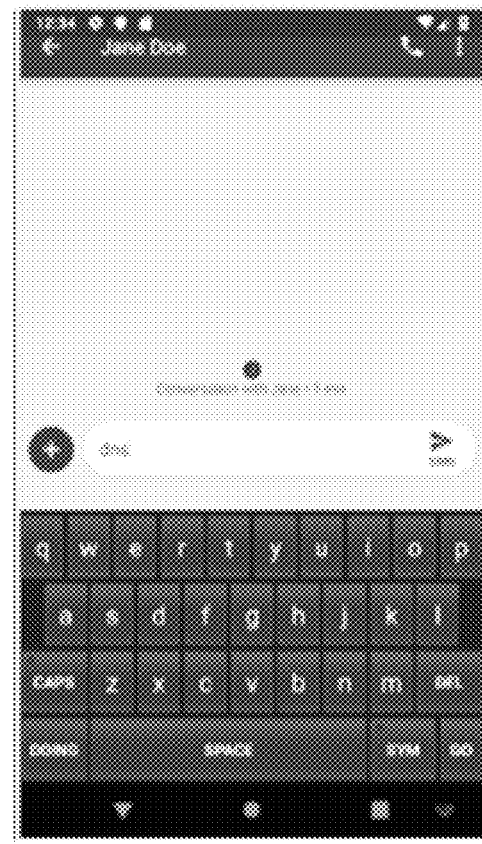
FIG. 12 is a block diagram showing, by way of example, the keyboard of FIG. 1 with an "s" key press to type a word not in a dictionary.

FIG. 12 is a block diagram showing, by way of example, the keyboard of FIG. 1 with an "s" key press to type a word not in a dictionary. The "s"-key is pressed. All alphabetic keys continue to be enabled. The intended word is completed and the user has the option to enter the new word into the dictionary list in two different ways.

Figure 13:
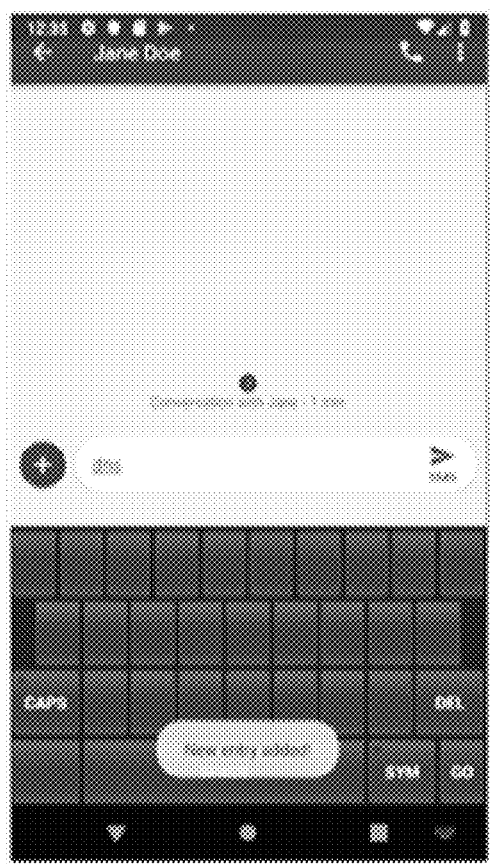
FIG. 13 is a block diagram showing, by way of example, the keyboard of FIG. 1 with a "DOING"-labeled key press to type a word not in a dictionary.

FIG. 13 is a block diagram showing, by way of example, the keyboard of FIG. 1 with a "DOING"-labeled key press to type a word not in a dictionary. The multipurpose function key labeled "DOING" is pressed as the first option for entering the typed word in the dictionary. The typed "dns"-word is entered into the dictionary list, making the word available for future use. The multipurpose function key and all alphabetic keys are then disabled. The user may activate the alphabetic keys by pressing a non-letter key, such as the space key.

Figure 14:
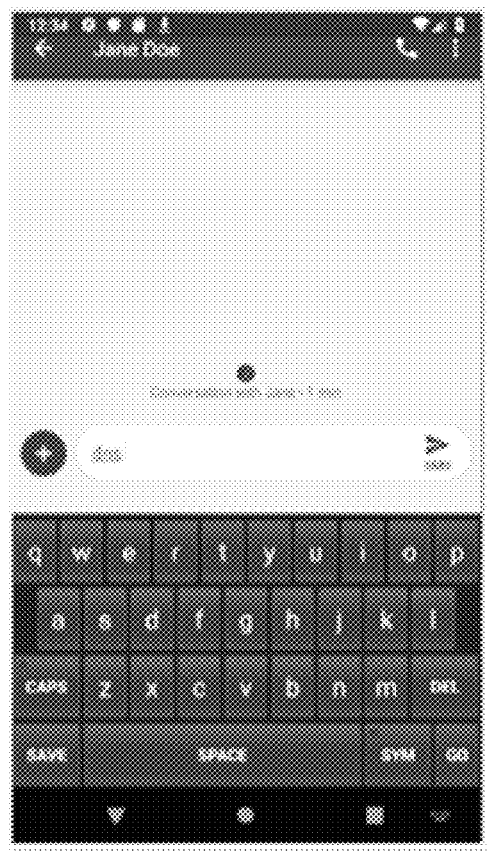
FIG. 14 is a block diagram showing, by way of example, the keyboard of FIG. 1 with a space key press to type a word not in a dictionary.
Figure 15:
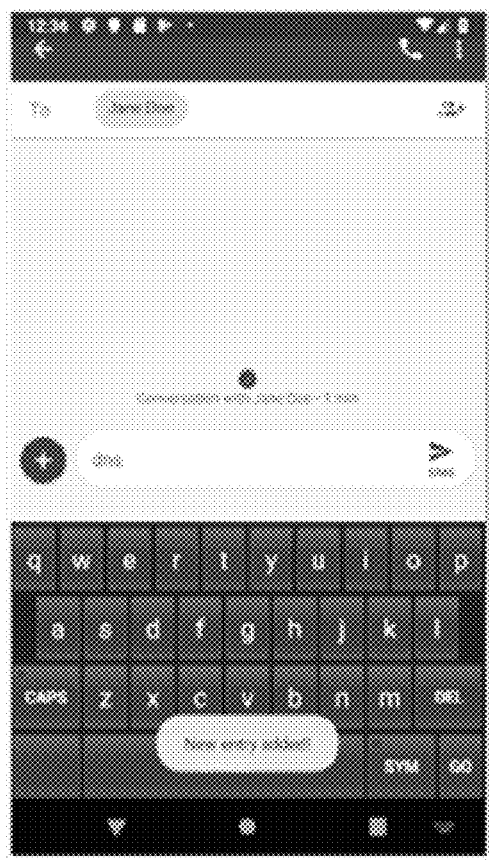
FIG. 15 is a block diagram showing, by way of example, the keyboard of FIG. 1 with a "SAVE"-labeled key press to type a word not in a dictionary.

FIG. 14 is a block diagram showing, by way of example, the keyboard of FIG. 1 with a space key press to type a word not in a dictionary. The space key is pressed as the second option for adding the typed word to the dictionary. FIG. 15 is a block diagram showing, by way of example, the keyboard of FIG. 1 with a "SAVE"-labeled key press to type a word not in a dictionary. All alphabetic keys are enabled. The multipurpose function key's label is changed to "SAVE" upon selection of the space key and by pressing the "SAVE" key, the user enters the new word into the dictionary list. Specifically, the multipurpose function key's label change to "SAVE" occurred because a new word unknown to the dictionary list was typed and was not saved before the space-key or other non-letter key was pressed.

In yet a further example, the user enters the word "nevis," which also does not exist in the dictionary list. However, in this example, artificial intelligence functionality is enabled and the new word is entered in the dictionary list. Before the word is started to be typed, all the alphabetic keys on the keyboard are enabled except for the multipurpose function key, as illustrated in FIG. 2.

Figure 16:
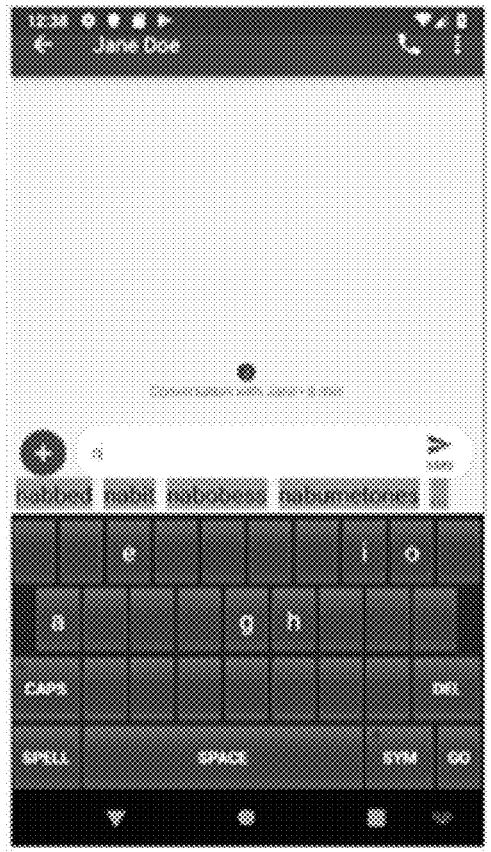
FIG. 16 is a block diagram showing, by way of example, the keyboard of FIG. 1 with an "n" key press to type a word not in a dictionary using artificial intelligence.

FIG. 16 is a block diagram showing, by way of example, the keyboard of FIG. 1 with an "n" key press to type a word not in a dictionary using artificial intelligence. The "n" key is selected by the user and letters that do not follow the letter "n" in any word in the dictionary are disabled. Meanwhile, the letters that follow the letter "n" in dictionary entries are enabled. The multipurpose function key activates after the first key press offering spelling typing assistance as an option.

Figure 17:
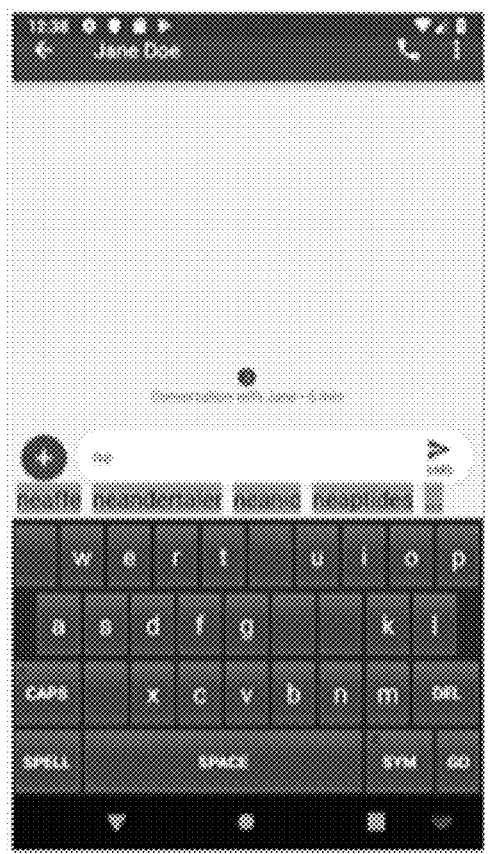
FIG. 17 is a block diagram showing, by way of example, the keyboard of FIG. 1 with an "e" key press to type a word not in a dictionary using artificial intelligence.

FIG. 17 is a block diagram showing, by way of example, the keyboard of FIG. 1 with an "e" key press to type a word not in a dictionary using artificial intelligence. The "e" key is selected by the user, which can change the availability of letters for selection, by disabling and enabling letters based on dictionary entries. Further, dictionary words beginning with the letters "n" and "e" are displayed for possibly selection by the user.

Figure 18:
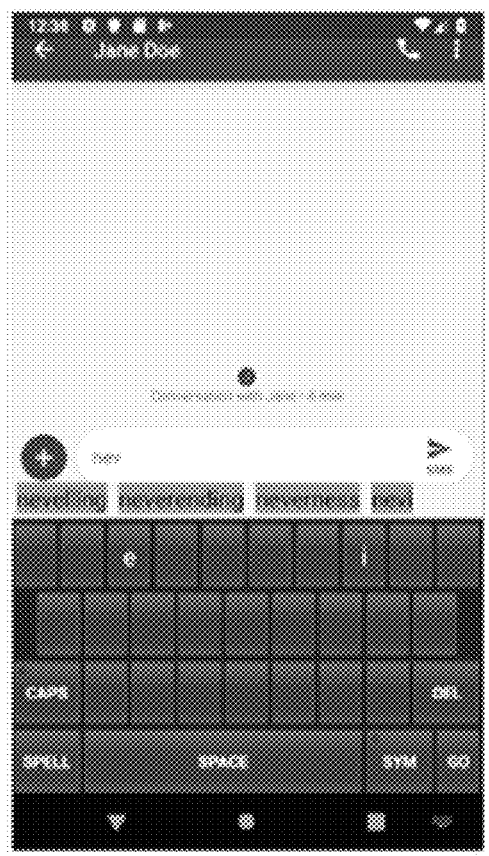
FIG. 18 is a block diagram showing, by way of example, the keyboard of FIG. 1 with an "v" key press to type a word not in a dictionary using artificial intelligence.

FIG. 18 is a block diagram showing, by way of example, the keyboard of FIG. 1 with an "v" key press to type a word not in a dictionary using artificial intelligence. The "v" key is selected by the user, which can change the availability of letters for selection, by disabling and enabling letters based on dictionary entries. Further, dictionary words beginning with the letters "n," "e," and "v" are displayed for possibly selection by the user.

Figure 19:
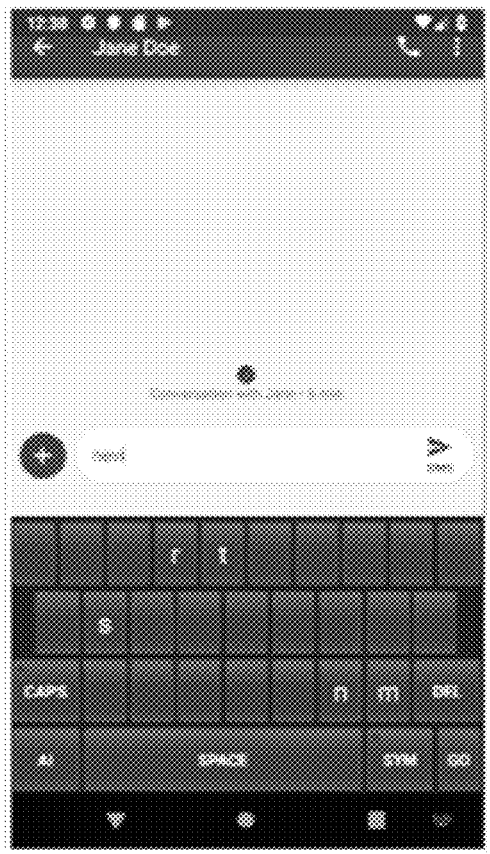
FIG. 19 is a block diagram showing, by way of example, the keyboard of FIG. 1 with an "i" key press to type a word not in a dictionary using artificial intelligence.

FIG. 19 is a block diagram showing, by way of example, the keyboard of FIG. 1 with an "i" key press to type a word not in a dictionary using artificial intelligence. The "i"-key is pressed. There are no more matches in the dictionary list starting with the sequence "nevi" as displayed also by the dictionary list area above the keyboard.

At this point, the label on the multipurpose function key changes to "AI", indicating that the enabled artificial intelligence functionality is activated. Thus, the "AI" label on the multipurpose function key appears upon typing a word and no more matches exist in the dictionary list. Some keys become enabled as if the typed letter character sequence were matching dictionary list options. This functionality appears to the user as predictive typing assistance even though no matches exist in the dictionary list. However, this is the present method's spelling typing assistance with the continuous predictive behavior of the artificial intelligence functionality. The next intended "s"-key is enabled and available. If the intended "s"-key would have been disabled, the user can simply interrupt the spelling typing assistance of the artificial intelligence functionality by pressing the multipurpose function key labeled "AI". This will reverse the state of the keys on the keyboard offering conventional spelling typing assistance with predictive behavior only for the next key press, as seen above with respect to FIGS. 9-15.

Figure 20:
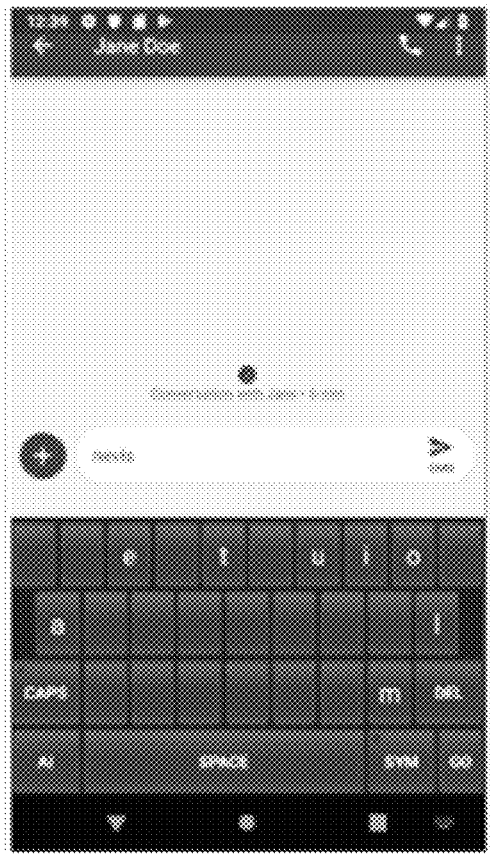
FIG. 20 is a block diagram showing, by way of example, the keyboard of FIG. 1 with an "s" key press to type a word not in a dictionary using artificial intelligence.

FIG. 20 is a block diagram showing, by way of example, the keyboard of FIG. 1 with an "s" key press to type a word not in a dictionary using artificial intelligence. The "s"-key is pressed. The intended word is completed. The artificial intelligence functionality continues to be active. The user has the option to interrupt the spelling typing assistance of the artificial intelligence functionality by pressing the "AI"-labeled key.

Figure 21:
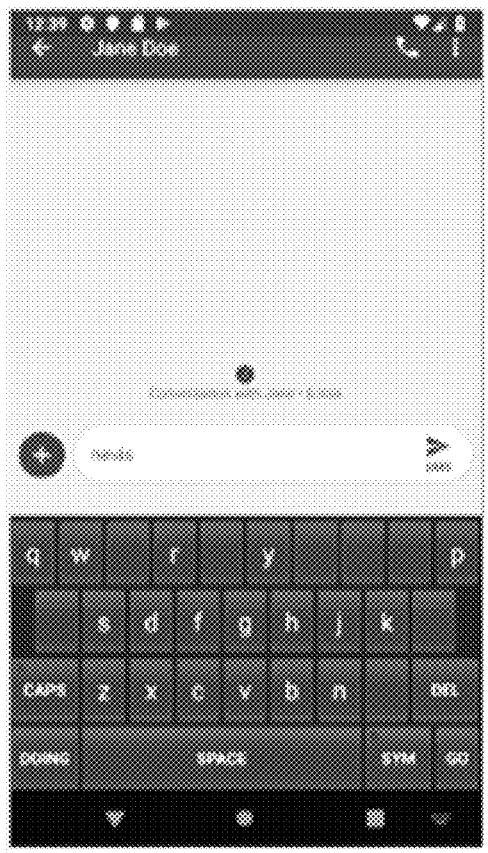
FIG. 21 is a block diagram showing, by way of example, the keyboard of FIG. 1 with an "AI"-labeled key press to type a word not in a dictionary using artificial intelligence.

FIG. 21 is a block diagram showing, by way of example, the keyboard of FIG. 1 with an "AI"-labeled key press to type a word not in a dictionary using artificial intelligence. Selection of the "AI"-labeled key can reverse the state of the keys, providing the conventional spelling typing assistance, as previously described.

Figure 22:
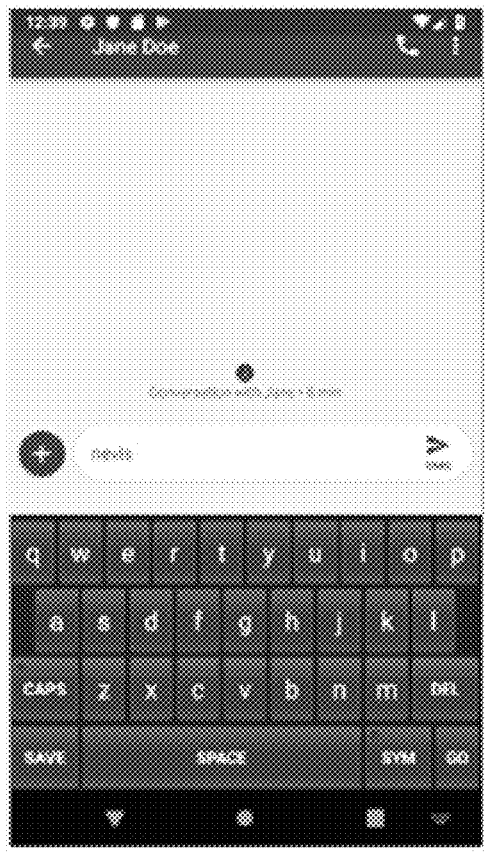
FIG. 22 is a block diagram showing, by way of example, the keyboard of FIG. 1 with a space key press to type a word not in a dictionary using artificial intelligence.

FIG. 22 is a block diagram showing, by way of example, the keyboard of FIG. 1 with a space key press to type a word not in a dictionary using artificial intelligence. The space-key is pressed. The multipurpose function key changes its label to "SAVE", offering user the option to enter the new word into the dictionary list. Artificial intelligence functionality is terminated.

Figure 23:
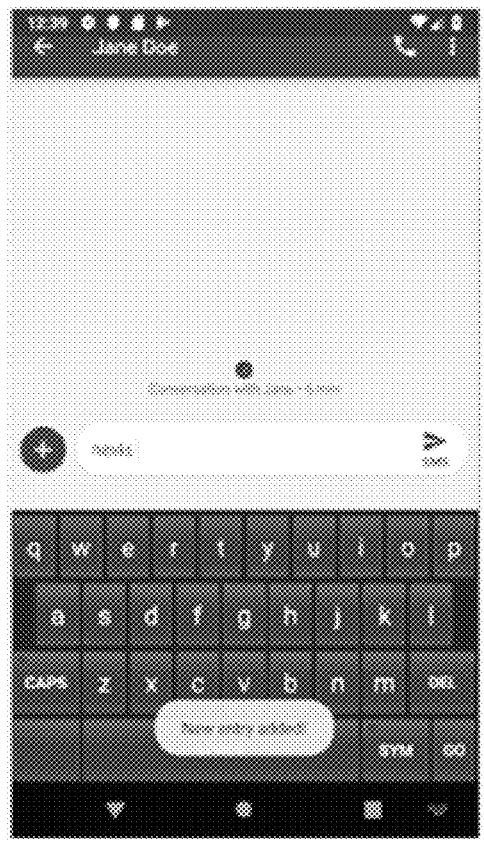
FIG. 23 is a block diagram showing, by way of example, the keyboard of FIG. 1 with a "SAVE"-labeled key press to type a word not in a dictionary using artificial intelligence.

FIG. 23 is a block diagram showing, by way of example, the keyboard of FIG. 1 with a "SAVE"-labeled key press to type a word not in a dictionary using artificial intelligence. The multipurpose function key labeled "SAVE" is pressed. The typed word is entered into the dictionary list, making the word available for later use.

As described above, spelling typing assistance with the continuous predictive behavior of the artificial intelligence functionality was activated when there were no matches in the dictionary list following the character sequence "nevi". The artificial intelligence functionality, once enabled, is also activated after the user initiates and executes the conventional spelling typing assistance as described below.

The user enters the word "doby." The word does not exist in the dictionary list. Artificial intelligence functionality is enabled. The new word is entered in the dictionary list. Before the word is started to be typed, all the alphabetic keys on the keyboard are enabled except for the multipurpose function key, as illustrated in FIG. 2.

Figure 24:
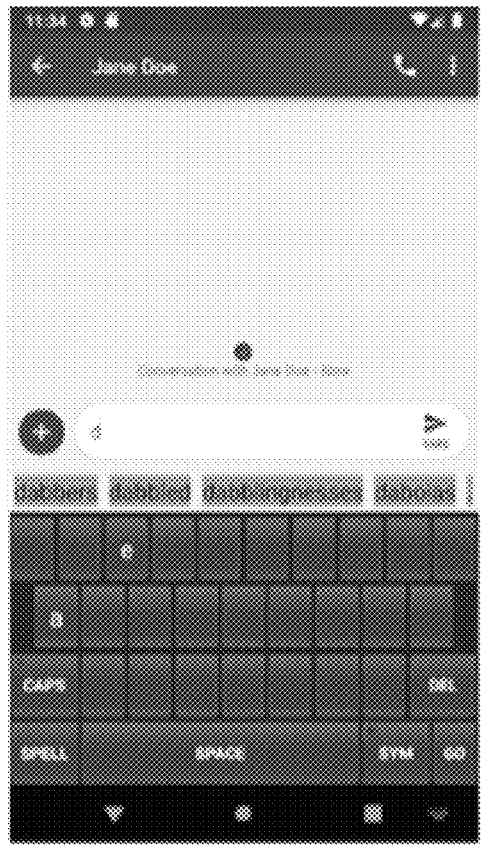
FIG. 24 is a block diagram showing, by way of example, the keyboard of FIG. 1 with a "d" key press to type a word not in a dictionary using artificial intelligence in a further example.

FIG. 24 is a block diagram showing, by way of example, the keyboard of FIG. 1 with a "d" key press to type a word not in a dictionary using artificial intelligence in a further example. The "d"-key is pressed. The "o"-key which corresponds to the next character of the intended "doby"-word is disabled, because there are no words in the dictionary list starting with the character sequence "do". As previously demonstrated, the multipurpose function key activates and changes label text to "SPELL", offering conventional spelling typing assistance.

Figure 25:
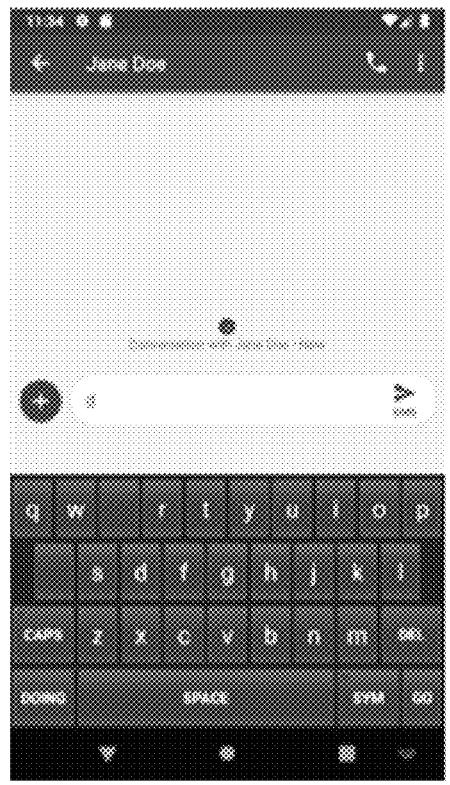
FIG. 25 is a block diagram showing, by way of example, the keyboard of FIG. 1 with a "SPELL"-labeled key press to type a word not in a dictionary using artificial intelligence in a further example.

FIG. 25 is a block diagram showing, by way of example, the keyboard of FIG. 1 with a "SPELL"-labeled key press to type a word not in a dictionary using artificial intelligence in a further example. Upon selecting the "SPELL"-labeled key, the multipurpose function key changes label text to "DOING", indicating that the conventional spelling typing assistance is in progress. The state of the keys is reversed and no, the "o"-key is enabled.

Figure 26:
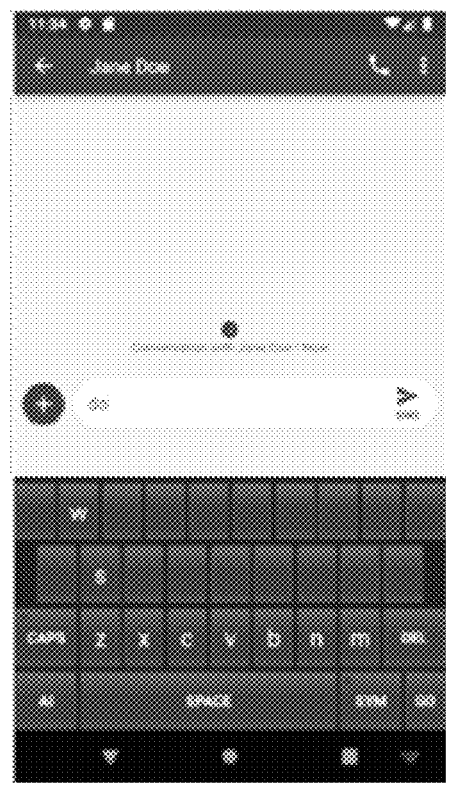
FIG. 26 is a block diagram showing, by way of example, the keyboard of FIG. 1 with an "o" key press to type a word not in a dictionary using artificial intelligence in a further example.

FIG. 26 is a block diagram showing, by way of example, the keyboard of FIG. 1 with an "o" key press to type a word not in a dictionary using artificial intelligence in a further example. The "o"-key is pressed. As the artificial intelligence functionality is enabled, the multipurpose function key changes text to "AI", indicating continuous spelling typing assistance. Now, keys are enabled and disabled according to the artificial intelligence functionality. The next intended "b"-key is enabled and available.

Figure 27:
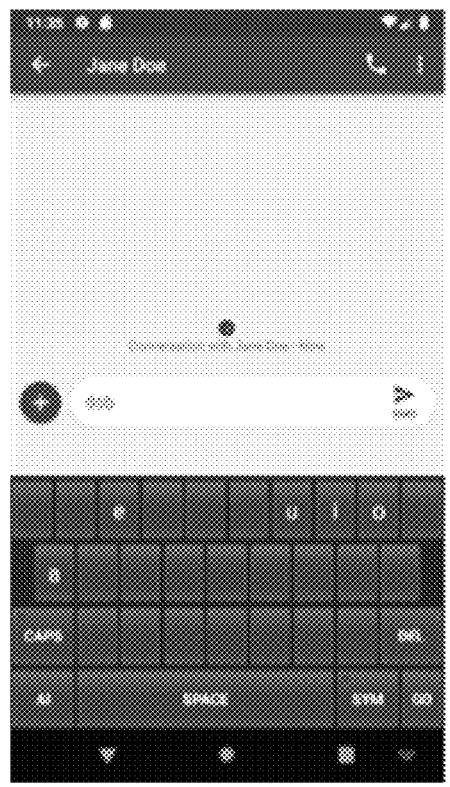
FIG. 27 is a block diagram showing, by way of example, the keyboard of FIG. 1 with a "b" key press to type a word not in a dictionary using artificial intelligence in a further example.

FIG. 27 is a block diagram showing, by way of example, the keyboard of FIG. 1 with a "b" key press to type a word not in a dictionary using artificial intelligence in a further example. The "b"-key is pressed. The "y"-key which corresponds to the next character of the intended "doby"-word is not enabled by the continuous spelling typing assistance of the artificial intelligence functionality. The user needs to interrupt the artificial intelligence functionality via the multipurpose function key.

Figure 28:
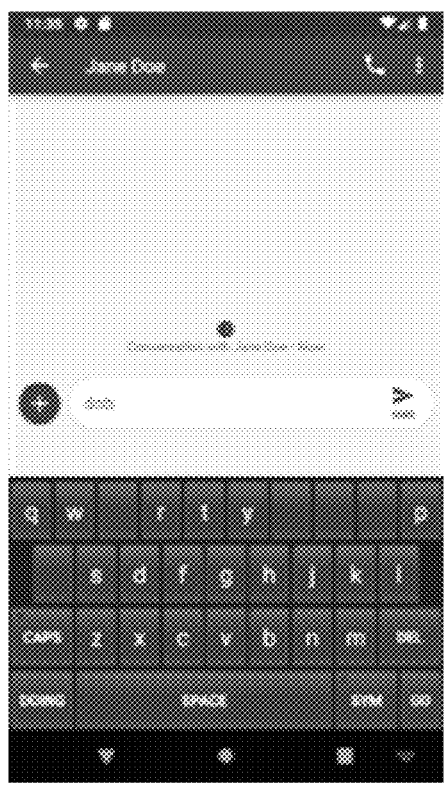
FIG. 28 is a block diagram showing, by way of example, the keyboard of FIG. 1 with an "AI"-labeled key press to type a word not in a dictionary using artificial intelligence in a further example.

FIG. 28 is a block diagram showing, by way of example, the keyboard of FIG. 1 with an "AI"-labeled key press to type a word not in a dictionary using artificial intelligence in a further example. The "AI"-labeled key is pressed. The artificial intelligence functionality is interrupted. The multipurpose function key changes label text to "DOING", indicating that the conventional spelling typing assistance is in progress. The state of the keys is reversed, thus making the "y"-key enabled.

Figure 29:
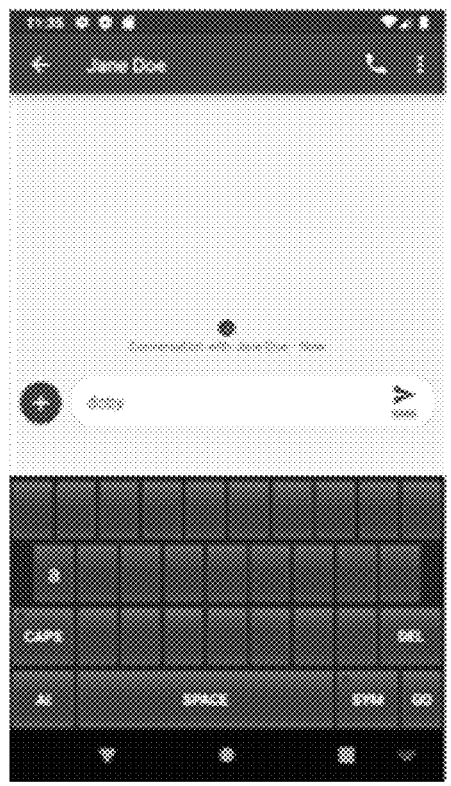
FIG. 29 is a block diagram showing, by way of example, the keyboard of FIG. 1 with a "y" key press to type a word not in a dictionary using artificial intelligence in a further example.

FIG. 29 is a block diagram showing, by way of example, the keyboard of FIG. 1 with a "y" key press to type a word not in a dictionary using artificial intelligence in a further example. The "y"-key is pressed. The intended word is completed. Again, since the artificial intelligence functionality is enabled, the multipurpose function key changes text to "AI", indicating continuous spelling typing assistance.

Figure 30:
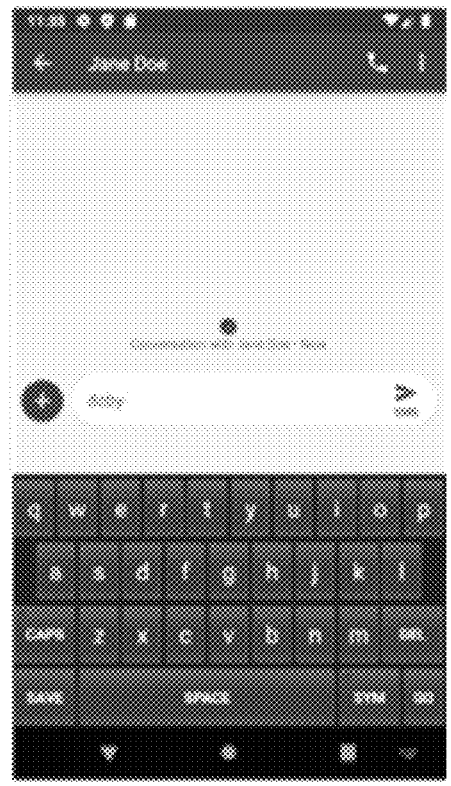
FIG. 30 is a block diagram showing, by way of example, the keyboard of FIG. 1 with a space key press to type a word not in a dictionary using artificial intelligence in a further example.

FIG. 30 is a block diagram showing, by way of example, the keyboard of FIG. 1 with a space key press to type a word not in a dictionary using artificial intelligence in a further example. The space-key is pressed. The multipurpose function key changes its label to "SAVE", offering user the option to enter the new word into the dictionary list. Artificial intelligence functionality is terminated.

Figure 31:
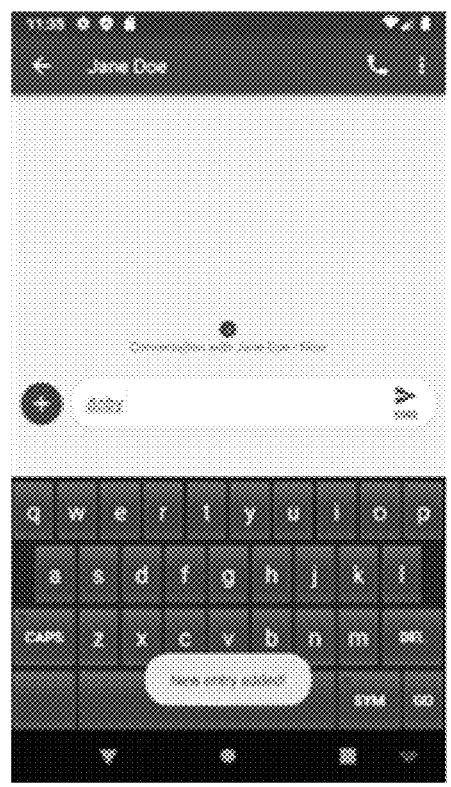
FIG. 31 is a block diagram showing, by way of example, the keyboard of FIG. 1 with a "SAVE"-labeled key press to type a word not in a dictionary using artificial intelligence in a further example.

FIG. 31 is a block diagram showing, by way of example, the keyboard of FIG. 1 with a "SAVE"-labeled key press to type a word not in a dictionary using artificial intelligence in a further example. The multipurpose function key labeled "SAVE" is pressed. The typed word is entered into the dictionary list, making it available for later use.

On a keyboard, an enabled key receives user press input while a disabled key ignores such input. The state of a key, i.e. whether a key is enabled or disabled, may be indicated to the user in many different ways, while using the present predictive typing assistance method. On a physical keyboard, a disabled key might be dim lighted, dim colored or might not have an indication, while on a virtual keyboard, a disabled key might be unlabeled or labeled otherwise, dim colored, dim patterned, shrunken in size, hidden (key's area on the keyboard is left empty) or removed (key's area on the keyboard is consumed by other visible keys). Respectively, on a physical keyboard, an enabled key might be bright lighted, bright colored or might not have an indication, while on a virtual keyboard, an enabled key might be labeled, bright colored, bright patterned, enlarged in size, visible (reversing hiding) or added (reversing removal by consuming area from other visible keys). In addition, a further extension of the multipurpose function key can enable the user to activate at will the artificial intelligence functionality and its spelling typing assistance with the continuous predictive behavior.

Predictive typing assistance and spelling typing assistance are provided with predictive behavior. Predictive typing assistance is the ability to enable and disable keys and buttons on keyboard when typing letter character sequences present in the dictionary list. Spelling typing assistance with predictive behavior essentially the ability to enable and disable keys and buttons on keyboard for letter character sequences not present in the dictionary list and can be conventional, that is a one letter prediction, when artificial intelligence functionality is disabled or continuous prediction when artificial intelligence functionality is enabled. Artificial intelligence functionality provides predictions according to internal algorithms rather than dictionary list's contents. Specifically, artificial intelligence functionality provides continued spelling typing assistance based on what has been typed instead of considering the dictionary's contents. The artificial intelligence functionality considers what has been typed and a length of what has been typed, the previous letter and previous syllable and may consider other factors as well.

As demonstrated, each user key press results in different sets of activate and inactive keys on the keyboard. There are numerous ways how active and inactive keys are represented to the user and this behavior depends on the data in the dictionary list which is user extendable. The user might have the ability to view options of the dictionary list that match a character sequence being typed. By selecting such an option, the user expedites the typing process even further while enjoying the benefits of the present method. Additionally, the user might have the ability to remove added data from the dictionary list. Overall, the intelligent behavior provided by the present predictive typing assistance method is customizable by the user.

Figure 32:
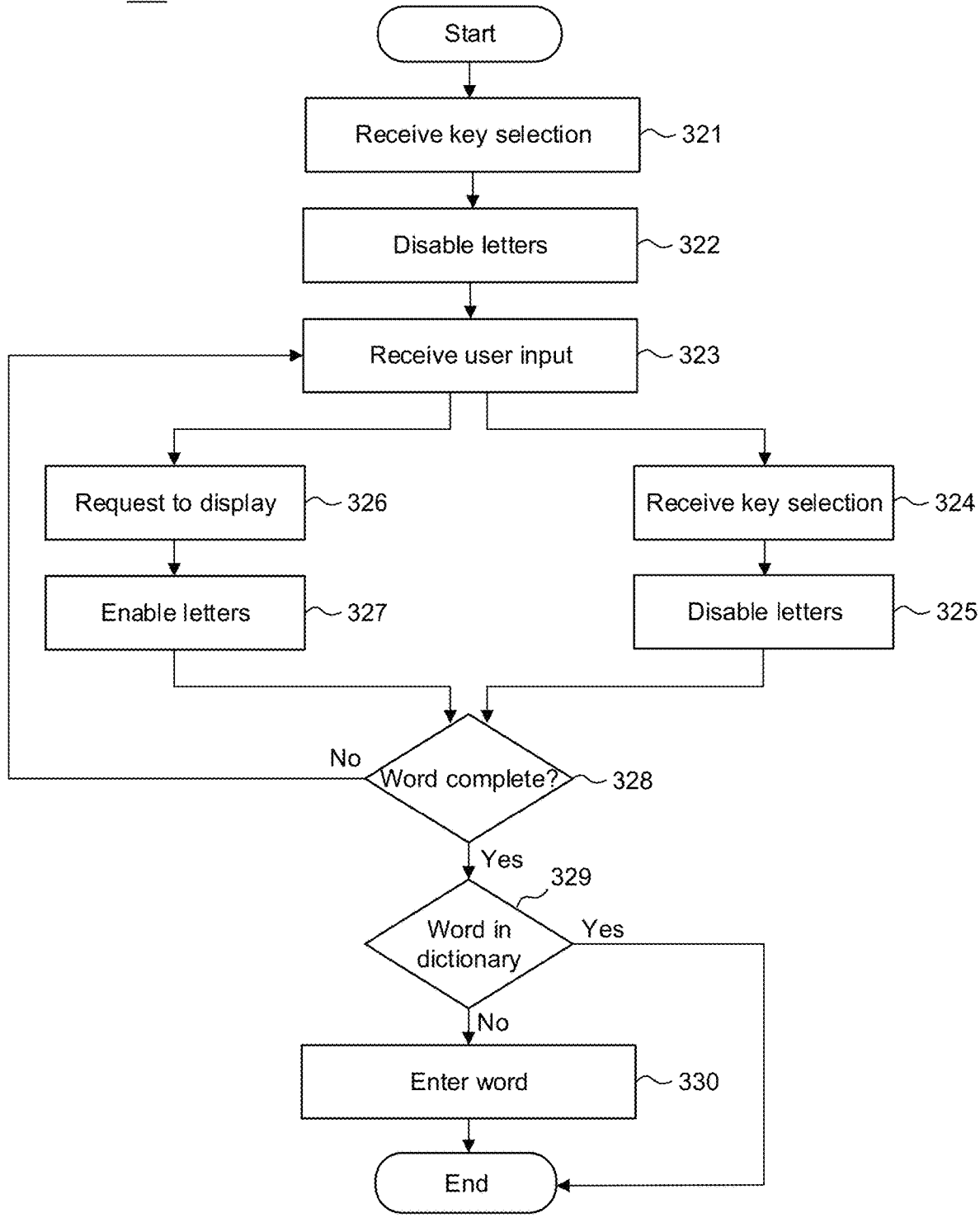
FIG. 32 is a flow diagram showing, by way of example, a method for predictive typing assistance.

Together, the predictive typing assistance and spelling typing assistance allow a user to quickly and accurately type words. FIG. 32 is a flow diagram showing, by way of example, a method 320 for predictive typing assistance. All keys are enabled and a user selects (step 321) one of the keys upon typing a word. Based on the letter selected by the user, some keys are disabled (step 322), such as based on the words in a dictionary associated with the user. Those letters that do not follow the typed letter in any of the words in the dictionary are disabled, while letters that do follow the typed letter are enabled.

Further input from the user is received (step 323). If the next letter is available, the user selects the key (step 324) and the letters for next selection by the user are enabled or disabled (step 325) based on the selected key. If the next letter is not enabled for selection, a multifunction key is available to the user to make the previously disabled letters or all the letters available for selection. Thus, the user can request (step 326) to display more letters by pressing the multifunction key and the previously disabled letters are now enabled (step 327). If the word is not complete (step 328), further user input is received (step 323). However, if the word is complete, such as determined from a lack of selection of letter keys or the selection of a non-letter key, a determination is made as to whether the typed word is in a dictionary (step 329). If so, the user can move on to the next word. However, if not, the word can be entered (step 330) in the dictionary.

While the invention has been particularly shown and described as referenced to the embodiments thereof, those skilled in the art will understand that the foregoing and other changes in form and detail may be made therein without departing from the spirit and scope.

What is claimed is:

1. A system for typing assistance, comprising:
a database comprising a dictionary list;
a mobile device comprising a central processing unit, an input port to receive the sensor data, and an output port, wherein the central processing unit is configured to:
receive one or more letter selections from a user via a keyboard;
provide examples of one or more words comprising the received letter selections selected from a dictionary list during predictive typing;
receive at least one additional letter selection;
determine no words comprising the letter selections and the additional letter selection exist in the dictionary list and disabling keys for all letters on the keyboard;
replace the predictive typing by automatically activating artificial intelligence functionality upon determining that no words comprising the letter selections and the additional letter selection exist in the dictionary list; and
enable one or more of the disabled keys via the artificial intelligence functionality.

2. A system according to claim 1, wherein the central processing unit receives a selection of one or more of the enabled letters.

3. A system according to claim 2, wherein the central processing unit saves the letter selections, additional letter selection, and received selection of the enabled letters as a word.

4. A system according to claim 2, wherein the word is added to the dictionary list for the predictive typing.

5. A system according to claim 1, wherein the central processing unit identifies the activated artificial intelligence functionality by displaying an indicator on a key on the keyboard.

6. A system according to claim 5, wherein the central processing unit receives a selection of the key with the indicator and disables the artificial intelligence functionality.

7. A system according to claim 6, wherein the predictive typing in enabled upon the disabling of the artificial intelligence functionality.

8. A system according to claim 1, wherein the artificial intelligence functionality is one of automatically enabled or enabled by the user.

9. A system according to claim 1, wherein the artificial intelligence functionality provides typing assistance outside the dictionary list used for the predictive typing.

10. A system according to claim 1, wherein the central processing unit disables the predictive typing and enables all the keys on the keyboard for manual selection by the user prior to enacting the artificial intelligence functionality.

11. A method for typing assistance, comprising:
receiving one or more letter selections from a user via a keyboard;
providing examples of one or more words comprising the received letter selections selected from a dictionary list during predictive typing;
receiving an additional letter selection;
determining no words comprising the letter selections and the additional letter selection exist in the dictionary list and disabling keys for all letters on the keyboard;
replacing the predictive typing by automatically activating artificial intelligence functionality upon determining that no words comprising the letter selections and the additional letter selection exist in the dictionary list; and
enabling one or more of the disabled keys via the artificial intelligence functionality.

12. A method according to claim 11, further comprising: receiving a selection of one or more of the enabled letters.

13. A method according to claim 12, further comprising: saving the letter selections, additional letter selection, and received selection of the enabled letters as a word.

14. A method according to claim 12, wherein the word is added to the dictionary list for the predictive typing.

15. A method according to claim 11, further comprising: identifying the activated artificial intelligence functionality by displaying an indicator on a key on the keyboard.

16. A method according to claim 15, further comprising: receiving a selection of the key with the indicator; and disabling the artificial intelligence functionality.

17. A method according to claim 16, wherein the predictive typing in enabled upon the disabling of the artificial intelligence functionality.

18. A method according to claim 11, wherein the artificial intelligence functionality is one of automatically enabled or enabled by the user.

19. A method according to claim 11, wherein the artificial intelligence functionality provides typing assistance outside the dictionary list used for the predictive typing.

20. A method according to claim 11, further comprising: prior to enacting the artificial intelligence functionality, disabling the predictive typing and enabling all the keys on the keyboard for manual selection by the user.

\* \* \* \* \*